June 7, 1966 M. B. COLLITO 3,254,650
SURGICAL ANASTOMOSIS METHODS AND DEVICES
Filed March 19, 1962 3 Sheets-Sheet 1
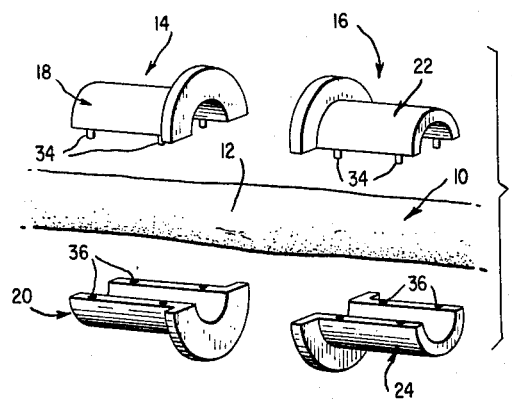
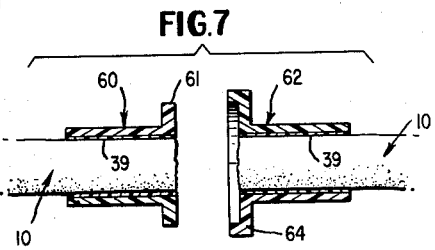
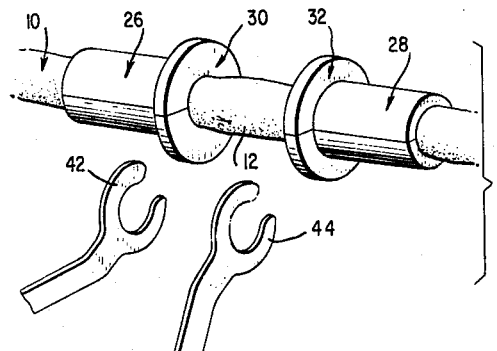
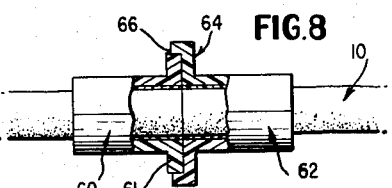
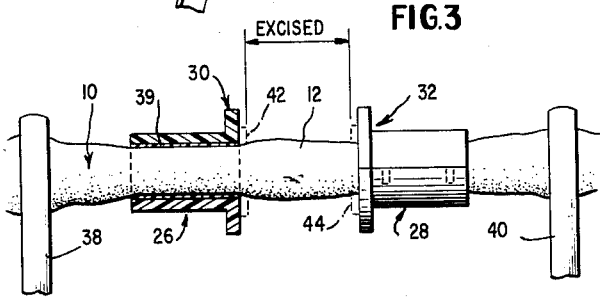
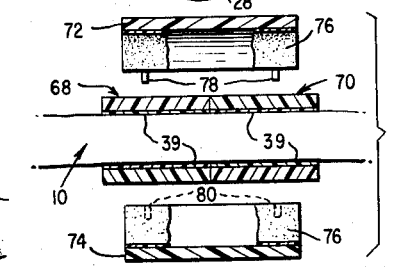
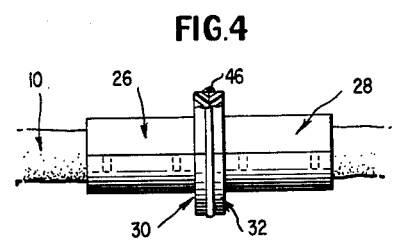
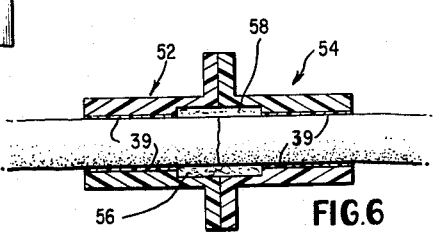
INVENTOR.
MICHAEL B. COLLITO
BY
*Shapiro and Shapiro*
ATTORNEYS June 7, 1966 M. B. COLLITO 3,254,650
SURGICAL ANASTOMOSIS METHODS AND DEVICES
Filed March 19, 1962 3 Sheets-Sheet 2

INVENTOR.
MICHAEL B. COLLITO
BY
*Shapiro and Shapiro*
ATTORNEYS

June 7, 1966   M. B. COLLITO   3,254,650
SURGICAL ANASTOMOSIS METHODS AND DEVICES
Filed March 19, 1962   3 Sheets-Sheet 3
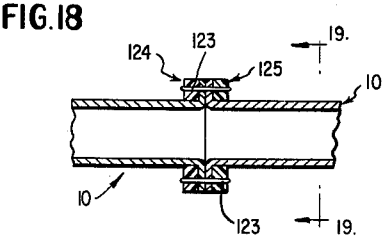
FIG.18
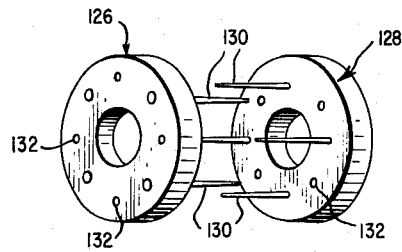
FIG.20
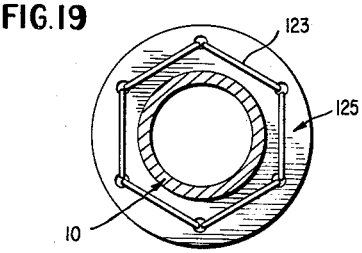
FIG.19
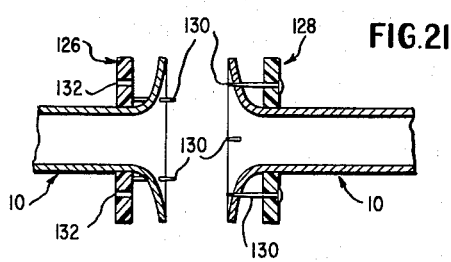
FIG.21
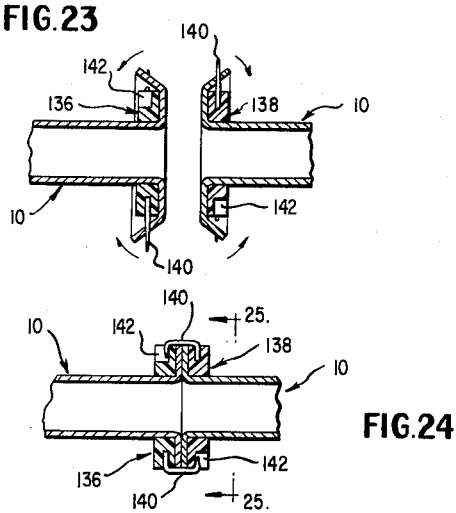
FIG.23
FIG.24
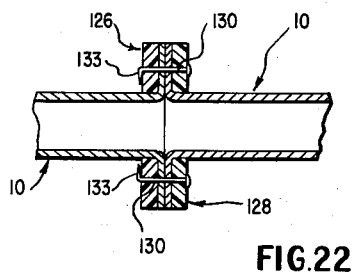
FIG.22
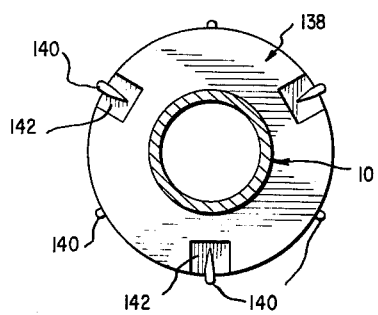
FIG.25
INVENTOR.
MICHAEL B. COLLITO
BY
*Shapiro and Shapiro*
ATTORNEYS

United States Patent Office 3,254,650
Patented June 7, 1966

3,254,650
SURGICAL ANASTOMOSIS METHODS
AND DEVICES
Michael B. Collito, South Orange, N.J.
(353 Roseville Ave., Newark, N.J.)
Filed Mar. 19, 1962, Ser. No. 180,462
16 Claims. (Cl. 128—334)

This invention relates to surgical methods and devices, and more particularly to methods and devices employed in anastomosis, such as the surgical repair of small blood vessels.

Prior anastomosis techniques have employed suturing, patching and shunting in the correction or repair of vascular anomalies and injuries. While such techniques have met with some success in their application to vessels of large diameter (e.g., 5 to 6 mm. O.D. and larger), the application of such techniques to small arteries and veins (e.g. 4 mm. or less) has been difficult and has had a high incidence of failure because of constriction and thrombosis. The problem is especially acute in surgery of intracranial vessels, because of the characteristic structure of the cerebral arteries, the presence of branches preventing rotation of the arteries, and limitations imposed by vascular occlusion time and lack of maneuverability.

Recently, the possibility of employing plastic as an adhesive material in vascular surgery has been considered, and studies have been undertaken in which a cyanoacrylate adhesive has been utilized. Although these studies have indicated that such adhesive may be useful in vascular surgery, the surgical techniques and devices which have evolved have been unduly complex, have required lengthy interruption of the flow of blood through the vessel being treated, and have been hampered by the substantial possibility of intralumenal thrombosis caused by the introduction of the adhesive material into the vessel. Moreover, these devices and techniques have produced leakage and aneurysmal dilatation.

It is accordingly a principal object of the present invention to provide improved surgical methods and devices.

A further object of the invention is to provide unique methods and devices for anastomosis and similar procedures, for the correction and repair of body member anomalies and injuries, and for the substitution and transplanting of body organs.

More specifically, it is an object of the present invention to provide methods and devices of the foregoing type which may be utilized much more simply and rapidly than comparable methods and devices known heretofore.

Other specific objects of the invention are to minimize the time during which vascular blood flow must be arrested, to permit the fixation of anastomosis connector devices even before the vessel is severed, to eliminate the difficulties previously experienced in the alignment of the vessel parts to be joined, to prevent the introduction of adhesive material into the lumen, to insure the firm attachment of the connector devices to the vessels, to prevent vascular collapse or aneurysm, and to promote the natural re-attachment of the parts of the anastomosed vessel.

Briefly stated, the present invention is concerned with the association of connector devices with body members, and especially body vessels, in such a way that parts of the body members may be readily joined to each other or to parts of other members. In general, the techniques of the invention employ mating mechanical devices, to perform the connecting functions, the devices being secured to the parts of a body member and in turn connecting the parts.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments (proportions being varied for clarity of explanation), and wherein:

FIGURE 1 is an exploded perspective view illustrating an embodiment of the invention in which connector devices are assembled from mating parts to form a pair of sleeves having radial discoidal flanges;

FIGURE 2 is a perspective view illustrating the assembled connector devices of FIGURE 1 together with cutting guides which may be utilized;

FIGURE 3 is a longitudinal sectional view illustrating the manner in which the vessel is occluded and excised;

FIGURE 4 is a plan view illustrating the joining of the connector devices to accomplish anastomosis;

FIGURE 5 is a perspective view of an embodiment employing a pair of connector devices similar to the devices of FIGURES 1 through 4 but in conjunction with a retainer ring which locks the devices in position;

FIGURE 6 is a longitudinal sectional view of an embodiment of the invention employing connector devices similar to those of FIGURES 1 through 4 but shaped to provide a chamber for a hemostatic agent;

FIGURES 7 and 8 are longitudinal sectional views of another embodiment of the invention, employing an interlocking flange construction, the figures showing different stages of assembly;

FIGURE 9 is a longitudinal sectional view of another embodiment of the invention, in which the connector devices take the form of sleeves which are held in position by a circumscribing retainer sleeve shown in two parts;

Figure 14:
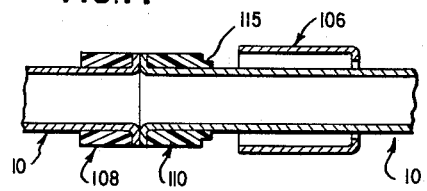
Figure 11:
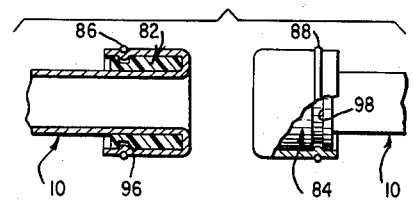
Figure 15:
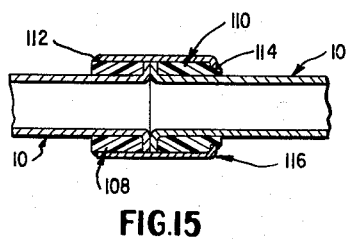
Figure 12:
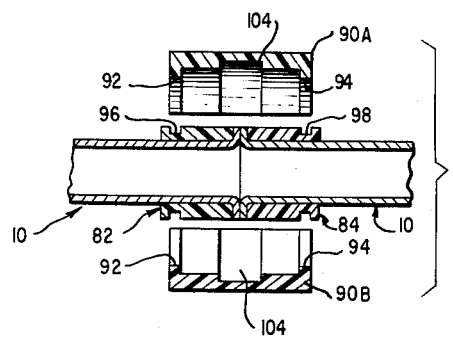
Figure 16:
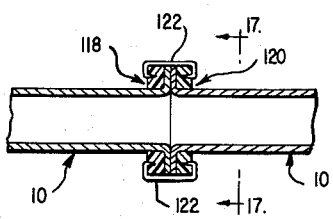
Figure 13:
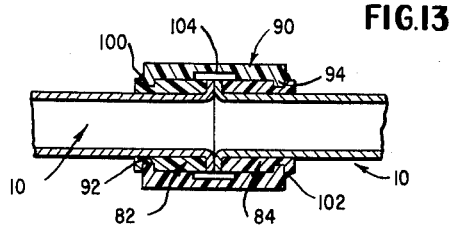
Figure 17:
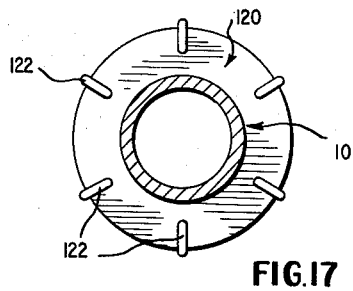

FIGURES 11, 12, and 13 are longitudinal sectional views of another embodiment of the invention, in which the ends of a vessel are everted over sleeves which are brought together and held in position by a retainer ring, the figures illustrating successive stages of an anastomosis procedure;

FIGURES 14 and 15 are longitudinal sectional views of a further embodiment of the invention, in which the vessel ends are everted over sleeves held in position by an axially moved retainer sleeve, the figures illustrating successive stages of the procedure;

FIGURE 16 is a longitudinal sectional view of still another embodiment of the invention, in which sleeves are fixed in position by means of clips or staples;

FIGURE 17 is a transverse sectional view along line 17—17 of FIGURE 16;

FIGURE 18 is a longitudinal sectional view of an embodiment somewhat similar to the embodiment of FIGURES 16 and 17, but employing ligatures to hold the sleeves or discs in position;

FIGURE 19 is a transverse sectional view along line 19—19 of FIGURE 18;

FIGURE 20 is a perspective view of another embodiment of the invention, in which discs or sleeves having axial pins are employed;

FIGURE 21 is a longitudinal sectional view of this embodiment showing the manner in which the pins pierce everted vessel ends;

FIGURE 22 is a longitudinal sectional view illustrating a further stage of the technique of FIGURES 20 and 21;

FIGURES 23 and 24 are longitudinal sectional views of yet another embodiment of the invention, in which radial pins are utilized, the figures showing successive stages in accordance with the procedure of the invention; and FIGURE 25 is a transverse sectional view taken along line 25—25 of FIGURE 24.

In certain embodiments of the invention to be described use is made of cyanoacrylate adhesive and more particularly of an adhesive known as Eastman 910, sold by Chemicals Division, Eastman Chemical Products, Inc., Kingsport, Tennesse.

This adhesive is a monomeric alkyl ester of alpha-cyanoacrylic acid having the general formula:

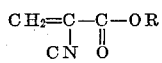

Where R is an alkyl group of 1 to 16 carbon atoms, a cyclohexyl group, or a phenyl group. More specifically, the Eastman 910 adhesive is 90–92% methyl alpha-cyanoacrylate, with 3–4% ester type plasticizer, 5–6% polymeric type thickening agent, and a trace of an inhibitor or stabilizer. Thin films of the adhesive are rapidly autopolymerizable, being stabilized against polymerization in bulk by a stabilizing agent such as sulphur dioxide, present in a concentration of about 0.001% to 0.06% by weight. Highly tenacious bonds are rapidly produced with very thin applications of the adhesive. Adhesives of the foregoing type are described in the following United States patents: 2,721,858; 2,748,050; 2,756,251; 2,763,585; 2,763,677; 2,765,332; 2,768,109; 2,776,232 2,784,127; 2,784,215; 2,794,788; 2,816,093.

Referring to the drawings, and initially to FIGURES 1 through 4, one form of the invention is shown applied to a surgical operation in which a body member 10 such as a small vein or artery, is to be repaired by the removal of a defective portion 12, and by anastomosis of the vessel parts remaining after removal of the defective section. In the form shown a pair of mating connector devices 14 and 16 is associated with the vessel. Each device has a pair of component parts 18 and 20, or 22 and 24, which fit together to form a sleeve or ring 26 or 28 (FIGURE 2) having a radial discoidal flange 30 or 32 at one end thereof. The connector parts preferably have interfitting protuberances 34 and recesses 36 which fit snugly and facilitate the alignment and retention of the parts.

In accordance with one form of the invention, the above described connector devices are assembled from their parts in situ so as to embrace and ultimately circumscribe the vessel as shown in FIGURE 2, the flanges 30 and 32 being spaced on either side of the defective portion 12. The vessel is exposed carefully, using a solution such as procain to prevent spasm, and then is denuded of adventitia and dried. To affix the connector parts to each other and to the vessel, droplets of the aforesaid Eastman 910 adhesive are applied to the inner and mating surfaces of the sleeve parts and flange parts. The connector parts are then positioned adjacent the vessel as shown in FIGURE 1 and brought together around the vessel (FIGURE 2) with sufficient pressure to cause the Eastman 910 to be spread into a thin film 39 (see FIGURE 3), which rapidly polymerizes and provides a tenacious bond between the connector parts and vessel. The pressure of the blood flowing through the vessel provides a backing force which opposes any constricting effect of the connector sleeves. It is contemplated that the connector devices will be made available with a range of inner diameters suitable for use with vessels of different size. The inner diameter of the connector device should approximate the outer diameter of the vessel so that contact is insured without undesirable constrictional pressures on the vessel.

It now remains to remove the defective portion 12 between the connector devices 26 and 28 and reconnect the severed ends of the vessel. As shown in FIGURE 3 the blood supply through the vessel may be temporarily interrupted by the use of bulldog clamps 38 and 40, or the like, applied to spaced portions of the vessel 10 bracketing the connector devices 14 and 16. Then the defective portion of the vessel is excised by the use of a scapel or similar instrument. The vessel may be cut flush with the respective surfaces of the flanges 30 and 32, or in order to allow for vessel contraction, spacers 42 and 44 may be placed over the vessel against the flanges 30 and 32, respectively, and used as a guide for the cutting of the vessel. The ends of the remaining vessel portions are thus substantially coterminous with the adjacent extremities of the connector devices. After the defective portion 12 has been removed, the vessel portions between the clamps may be irrigated with normal saline solution and dried of excess moisture. Then the flanges 30 and 32 are brought together in alignment as shown in FIGURE 4, and held in position until they are secured. In the form shown the attachment of the flanges is accomplished by the application of a thin film of Eastman 910 to the peripheral juncture of the flanges as shown at 46 in FIGURE 4. After a few moments, the adhesive has set and the flanges 30 and 32 are permanently connected. It will be noted that the adhesive film 46 is far removed from the lumen of the vessel, so that there is no opportunity for the adhesive material to enter the vessel. Clamps 38 and 40 may now be removed to reestablish the blood flow through the vessel, thereby effecting a complete repair.

FIGURE 5 illustrates a modification of the invention in which a retainer ring 48 is placed over the flanges 30 and 32, eliminating the need for applying Eastman 910 or the like to the flanges. The retainer ring may be formed in two parts or hinged as shown, and preferably has a channel shaped interior so that the ring may embrace the flanges. The ring may be closed by means of any suitable latch, such as a tongue 50 mating with a slot (not shown) and fixed by a pin or detent. Alternatively, the ring may be closed by applying Eastman 910 to the adjoining ends.

FIGURE 6 illustrates a modification of the invention in which connector devices 52 and 54 may be formed generally like those previously described but are shaped as to provide an annular chamber 56 which may be filled with a hemostatic agent 58, such as cellulose fibers. A typical commercially available material is "Oxycel," sold by Johnson and Johnson. The hemostatic agent may be in the form of a sleeve which is fitted into the chamber 56 before the connector parts are brought together, and serves to promote rapid growth of the apposed ends of the vessel parts.

FIGURES 7 and 8 illustrate another version of the invention, in which one of the connector devices, 60, is similar to the devices 14 and 16 previously described, having a flange 61, and the other device, 62, has a somewhat larger, cup-shaped flange 64 which receives the flange 61 as shown in FIGURE 8. The flanges preferably have a tight friction, interference, or snap-lock fit and are preferably permanently affixed by means of a film 66 of Eastman 910 applied to the circumferential junction line of the flanges. The alignment of these flanges is almost automatic, and the flanges provide a self-lock even before the adhesive has set.

Figure 10:
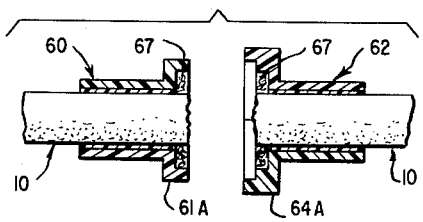
FIGURE 10 is a longitudinal sectional view of an embodiment of the invention similar to that illustrated in FIGURES 7 and 8 but incorporating a hemostatic chamber.

FIGURE 10 illustrates an embodiment of the invention similar to that of FIGURES 7 and 8, but in which a hemostatic chamber is utilized. This chamber may be defined by forming a pair of annular grooves 67 and 67 in the corresponding flanges 61A and 64A, so that when the flanges are brought together an annular chamber is formed at the vessel junction region. The chamber may be filled with a hemostatic agent as previously described, which may be provided in the form of a sleeve or a pair of rings of hemostatic material.

FIGURE 9 illustrates a somewhat different modification of the invention. In this form, connector devices 68 and 70 are sleeves, which may be constricted like the sleeves 26 and 28 of FIGURE 2, but without the flanges. After the attachment of the sleeves 68 and 70 to the vessel 10, the adjacent ends of the sleeves are brought into alignment and contact. The sleeves are then held in position by means of a retainer sleeve comprised of sleeve parts 72 and 74 which are brought together over the sleeves 68 and 70 and secured thereto by means of a film of Eastman 910, as indicated at 76. The retainer sleeves may have the pins 78 and mating slots 80 of the type previously described to facilitate the alignment of the sleeve parts and mutual affixation.

While the foregoing embodiments of the invention have been described with reference to a general procedure in which sleeve parts are affixed to an intact vessel or the like, which then is severed, the invention may also be employed with a pre-severed vessel by applying the connector parts to the ends of the vessel and then joining the parts as before. In such procedures it is possible to utilize connector devices which are unitary sleeves capable of being slipped onto a vessel end. Embodiments of the invention will now be described in which the connector devices are especially constructed for use with a previously severed vessel, it being assumed that the vessel blood supply has been interrupted, and that the vessel has been suitably prepared as by irrigation with normal saline.

In the embodiments shown in FIGURES 11–13, vessel 10 is severed (a defective portion may be removed), and sleeves 82 and 84 are slipped over the corresponding ends of the vessel. Then the vessel ends are everted by well-known surgical techniques so that in effect the vessel is turned inside out over each of the sleeves. The everted portions are then held in position temporarily as by ligatures 86 and 88. It is preferable to bring the everted portions over the slots 96 and 98 and to secure the ligatures there as shown. The everted portions are then brought together in abutting relationship as shown in FIGURE 12. Then, while the parts are held in this relationship, as by a suitable clamp (not shown), the portions of the vessel held by the ligatures 86 and 88 are cut away approximately flush with the outer surface of the sleeves. The sleeves are urged together with sufficient pressure to retain the everted stub ends. A retainer ring 90 is then positioned about the sleeves so as to hold them in fixed position. The retainer ring may be formed in two parts 90A and 90B or hinged as described in connection with FIGURE 5. The retainer ring may also have internal ridges 92 and 94 which fit within corresponding annular sleeve grooves 96 and 98 so as to prevent axial movement of the sleeves. The retainer ring may be joined to the sleeves by means of Eastman 910 adhesive applied about the peripheral junction lines at 100 and 102. The retainer ring may also have a hemostatic chamber 104 which circumscribes the butted ends of the vessel parts and receives a suitable hemostatic agent and/or the protruding ends of the vessel if they are not cut perfectly flush with the outer surface of the sleeves. The abutting of the intimal surfaces of the vessel parts promotes rapid re-attachment of the parts.

FIGURES 14 and 15 illustrate an embodiment of the invention in which a retainer sleeve 106 is slipped over one of the severed vessel ends and pushed back away from the prospective joint; then sleeves 108 and 110 are slipped over the respective vessel ends; and the vessel ends are everted about sleeves 108 and 110 and held as before. The everted ends are then abutted, clamped, and cut flush with the outer surface of the sleeves. While the severed ends of the vessel are held clamped between the sleeves the retainer sleeve 106 is pulled over the joint to the position shown in FIGURE 15 and fixed in position, as by means of Eastman 910 applied at the circumferential regions 112 and 114. As shown, the sleeve 110 may be notched at 115 to receive an inwardly directed lip 116 of the retainer sleeve 106. The retainer sleeve may have a longitudinal slot (not shown) to facilitate clamping of sleeves 108 and 110 by a clamping implement while the retainer sleeve is pulled over the joint.

FIGURES 16 and 17 illustrate a form of the invention in which discs or sleeves 118 and 120 are slipped over the severed vessel ends as before, and the vessel ends are everted over the discs, held in position, abutted, clamped, and cut flush with the outer surface of the discs. The stubs of the everted ends are then permanently clamped between the discs 118 and 120 by means of staples or clips 122 spaced about the periphery of the discs as shown in FIGURE 17. If desired, the staples or clips may be located by axial grooves in the peripheral surfaces of the discs, and the ends of the staples or clips may be received within preformed recesses or holes in the appropriate end surfaces of the discs.

The form of the invention illustrated in FIGURES 18 and 19 is generally similar to the last-mentioned embodiment. In this form the same procedural steps are followed, except that ligatures or sutures 123 are passed through preformed passages in the discs 124 and 125 and through the abutted ends of the vessel. The ligature tie may be continuous, that is, passed through successive pairs of aligned passages, or may be divided into separate parts, that is, passed through a single pair of aligned passages and tied individually.

FIGURES 20–22 illustrate another "self-aligning" version of the invention in which discs or sleeves 126 and 128 are provided with preformed alternating axial pins 130 and axial passages 132. As shown in FIGURE 21, the discs are slipped over the severed ends of the vessel, and the vessel ends are then everted, but not necessarily as fully as in the previous embodiments of the invention. The everted ends are pulled back over the pins 130, which are oriented towards the mating disc as shown. The pins are spike-shape so as to readily pierce the wall of the vessel and retain the vessel thereon. Then the discs are brought toward each other, and the pins of one disc are passed through the appropriately positioned openings of the other disc. When the discs are pressed together, the everted ends of the vessel are clamped between the discs, as shown in FIGURE 22, and the ends of the pins may then be bent over as at 133 to secure the discs permanently. This embodiment of the invention simplifies the eversion procedure and eliminates the need for clamping the discs tightly during their mutual fixation to prevent the everted vessel ends from being pulled from between the discs.

A somewhat similar embodiment of the invention is shown in the FIGURES 23–25. Here discs or sleeves 136 and 138 have a series of radially disposed spikes or pins 140. The vessel ends are everted and pulled over the pins, and then, after the discs are brought together, the pins are bent over the edge of the mating disc in interdigital fashion, so as to secure the discs permanently. Recesses 142 may be provided to receive the ends of the pins, and the "spiked" vessel ends may be cut away as each pin is bent.

The devices utilized in the invention may be formed of any suitable material, such as stainless steel or other metal, plastic, or hard rubber. In the embodiments in which Eastman 910 or other suitable adhesive is employed, the material of which the devices is formed is preferably one which readily bonds to the adhesive. Such materials are well known, and are set forth, for example, in the patent literature referred to previously. In those embodiments in which Eastman 910 is not employed, the parts may be formed of well known materials which are ultimately absorbed by the body, or of textile fabrics.

While the invention has been described principally in connection with vascular surgery, it will be appreciated by those skilled in the art that the principles of the invention are applicable to other types of surgical procedures, such as the repair or mending of the intestine, or of nerve fibers. Of course, when the body member to which the invention is applied is not hollow, the embodiments in which eversion is employed may be inapplicable.

It will also be appreciated that the invention is applicable to the substitution of transplanting of body members or organs. For example, preparations for the insertion of a substitute organ can be made by affixing connector devices to the body vessels which will secure the organ. Then, when the existing organ is removed, the prepared vessel ends may be immediately joined to mating devices previously secured to the severed vessel ends associated with the organ to be transplanted.

Therefore, while preferred embodiments of the invention have been shown and described, it will be apparent to those skilled in the art that modifications can be made without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. In the art of surgery, a method which comprises embracing a living body member by two spaced pairs of connector elements, adhesively affixing the elements of each pair to said body member to form a pair of spaced connector devices, then removing the portion of the body member between said connector devices, and joining said connector devices to bring the remaining portions of the body member together.

2. A method of repairing a blood vessel, which comprises adhesively affixing connector devices to the blood vessel on opposite sides of a defective region, temporarily stopping the flow of blood through said vessel, excising the defective region, joining said connector devices to bring the remaining portions of the vessel together, and reinstituting the flow of blood through said vessel.

3. In the art of surgery, a method which comprises adhesively affixing a pair of connector devices in spaced relationship on a living body member, then removing the portion of the body member between said connector devices and rendering the remaining portions of the body member substantially coterminous with the adjacent extremities of said connector devices, and joining the connector devices to bring the remaining portions of the body member together.

4. The method of claim 3, wherein said connector devices are affixed to said body member by means of a cyanoacrylate adhesive.

5. The method of claim 3, further comprising applying a hemostatic agent to the juncture of said remaining portions.

6. A method of anastomosis, which comprises assembling about each of separate living body member portions to be joined a pair of flanged ring parts, adhesively affixing each pair of parts to its body member portion to form a flanged ring with the flange of each ring substantially coterminous with the corresponding body member portion, and affixing the flanges to each other to join said body member portions.

7. The method of claim 6, wherein said flanged rings are affixed to said member portions and to each other by means of a cyanoacrylate adhesive.

8. A method of anastomosis which comprises assembling about each of separate living body member portions to be joined a pair of sleeve parts, adhesively affixing each pair of parts to its body member portion to form a sleeve with one end of each sleeve substantially coterminous with the corresponding body member portion, and affixing said ends of the sleeves to each other to join said body member portions.

9. The method of claim 8, wherein said sleeves are affixed to each other by applying thereto a film of cyanoacrylate adhesive at a region remote from the body member portions.

10. A method of anastomosis, which comprises adhesively affixing a pair of sleeves about separate body member parts to be joined, with the ends of the parts substantially coterminous axially with corresponding ends of the sleeves, bringing the ends of the sleeves together, and joining the sleeves by fixing a retainer ring over the sleeves.

11. An anastomosis assembly for joining portions of living body members, comprising a pair of sleeves, each of said sleeves being composed of a pair of relatively movable mating sleeve parts adapted to be brought together to embrace an end of one of said portions and thereby to form the sleeve, each of said sleeves having an inner diameter fitting the outer diameter of the corresponding one of said portions and being adapted to be affixed thereto by a film of adhesive, said sleeves having mating radially extending discoidal end flanges adapted to be abutted and joined to each other in order to join said body member portions.

12. An anastomosis assembly for joining portions of living body members, comprising a pair of sleeves, each sleeve having an inner diameter fitting the outer diameter of an end of one of said portions and being adapted to be fixed about said end, said sleeves being adapted to be brought together and joined in order to join said body member portions, and a retainer ring dimensioned to fit around said sleeves over said abutting ends and adapted to hold said sleeves together.

13. An anastomosis assembly for joining living body member portions, comprising a pair of sleeves, each sleeve having an inner diameter fitting the outer diameter of an end of one of said portions and being adapted to be adhesively fixed about said end, each of said sleeves having a radially extending discoidal end flange adapted to be abutted with the end flange of the other sleeve and joined thereto in order to join said body member portions, one of said flanges having a depression shaped and dimensioned to receive the other flange therein, whereby said flanges may be fitted together and fixed to each other by retaining means.

14. An anastomosis assembly for joining portions of living body members, comprising a pair of sleeves, each sleeve having an inner diameter fitting the outer diameter of an end of one of said portions and being adapted to be fixed about said end, said sleeves having mating ends adapted to be brought together and joined in order to join said body member portions, and at least one of said sleeves having a hemostatic agent chamber embracing its said end.

15. In a method of anastomosis and the like, the steps of placing a pair of sleeves over corresponding living body member portions to be joined and adhesively affixing the sleeves thereto, at least one of said sleeves having a hemostatic agent chamber surrounding the region of the prospective joint, placing a hemostatic agent in said chamber, and connecting said sleeves together to join said body member portions.

16. In the art of surgery, a method of joining a living body member to another member, which comprises assembling about said body member a pair of mating sleeve parts, forming a sleeve from said parts by applying adhesive between the embracing inner surfaces of said sleeve parts and the outer surface of said body member with the sleeve substantially coterminous with the body member, and attaching said sleeve to said other member.

References Cited by the Examiner

UNITED STATES PATENTS

| | | | |
|---|---|---|---|
| 1,151,300 | 8/1915 | Soresi | 128—334 |
| 2,638,901 | 5/1953 | Sugarbaker | 128—334 |
| 2,940,451 | 6/1960 | Vogelfanger et al. | 128—334 |
| 3,048,177 | 8/1962 | Takaro | 128—334 |

OTHER REFERENCES

Bickman: "Operative Surgery," vol. II, 1924, p. 12.

Lespinasse et al.: "A Practical Mechanical Method of End-to-End Anastomosis of Blood Vessels," JAMA, Nov. 19, 1910, vol. LV, pp. 1785–90.

Carton et al.: World Neurology 1:356; 1960.

RICHARD A. GAUDET, *Primary Examiner.*

JORDAN FRANKLIN, DALTON L. TRULUCK, *Examiners.*